DATA TRANSMISSION SUBSET WITH MODE INDICATING AND SELECTION MEANS

Filed Dec. 19, 1967 3 Sheets-Sheet 1

INVENTORS
LEONARD E. GONSEWSKI
RICHARD A. MORSTADT
BY
Robert J. Black
AGENT

DATA TRANSMISSION SUBSET WITH MODE INDICATING AND SELECTION MEANS

Filed Dec. 19, 1967

United States Patent Office 3,524,935
Patented Aug. 18, 1970

3,524,935
DATA TRANSMISSION SUBSET WITH MODE INDICATING AND SELECTION MEANS

Leonard E. Gonsewski, Morton Grove, and Richard A. Morstadt, Elmhurst, Ill., assignors to Automatic Electric Laboratories, Inc., Northlake, Ill., a corporation of Delaware

Filed Dec. 19, 1967, Ser. No. 691,857
Int. Cl. H04m *1/00*
U.S. Cl. 179—81 4 Claims

ABSTRACT OF THE DISCLOSURE

Apparatus for connecting data processing equipment to switched voice frequency communication channels, including equipment for transmission and reception of frequency shift keyed signals and conversion to serial binary signals for use with data processing systems, and equipment for transmission and reception of voice signals, with provision for visual indication of data mode operation.

BACKGROUND OF THE INVENTION

Field of the invention

The present invention relates to electrical communication systems for the handling of intelligence in data processing systems between two points located remotely from each other and connectable by means of a switched network. More specifically the present apparatus is a subset or data required for the interconnection of data processing equipment over communication channels such as telephone lines. Equipment of this sort is required by common carriers so that proper utilization and control of communication facilities is maintained.

Description of the prior art

Data transmission common carrier subsets are well known. These subsets are frequently utilized in the transmission of teletype machine signals over voice grade switchable two-wire transmission facilities. Data sets of this type are disclosed in Pat. No. Re. 26,099 to R. E. Stoffels issued Oct. 11, 1966, and U.S. Pat. 3,206,544 to R. E. Stoffels et al. issued Sept. 14, 1965, both assigned to the same assignee as this application; and U.S. Pat. 3,113,176 to T. L. Doktor et al. issued Dec. 3, 1963 and U.S. Pat. 3,307,149 to T. L. Doktor et al. issued Feb. 28, 1967.

More recently data sets with facilities for the transmission of voice and data over voice grade switchable two-wire transmission facilities have been developed to act as an interface for a large variety of business machines or data processing equipment In data sets such as these voice transmission facilities are included as well as data transmission facilities, to permit the verbal exchange of information between attendants or operators prior to and after transmission of data between business machines over telephone lines or similar transmission facilities. Data sets of this type and most similar to that in the present disclosure are those manufactured by Western Electric Company and designated WE103.

Present data sets of the voice-data type exhibit certain difficulties of operation for an attendant who wishes to know what mode the data set is operating in, or in returning to the voice mode after data transmission has been completed so that an exchange of verbal information might be effected by operators.

SUMMARY OF THE INVENTION

This invention pertains to a data set used for the transmission and reception of information from and to data processing equipment over two-wire switched voice frequency communication facilities. The present data set is of the type intended for use with an associated telephone subset permiting voice transmission over the same communication facilities as well as utilizing the telephone subset for the establishment of the switched line connection. The present data set is intended primarily for usage over switched telephone lines, rather than private or so-called leased lines, providing selectable communication between a multiplicity of points.

The present data set includes facilities for providing a visual indication of operation in the data mode. This feature gives the station attendant a visual indication of the status of the data link, indicating that both originating and answering stations are in condition to transmit and receive data.

In several figures of the drawings, the relay contacts are shown detached from the relay winding. Contacts which are closed when the associated relay is deenergized, known as "break contacts," are represented by a single short line perpendicular to the conductor line, and contacts which are closed when the relay is energized, known as "make contacts" are represented by two short lines diagonally intersecting the conductive line. Each set of relay contacts is identified by the relay coil designation together with an individual contact number. A numerical indication of the total number of relay contact sets associated with each coil is shown directly below each coil designation.

DESCRIPTION OF THE PREFERRED EMBODIMENT

Figure 1:
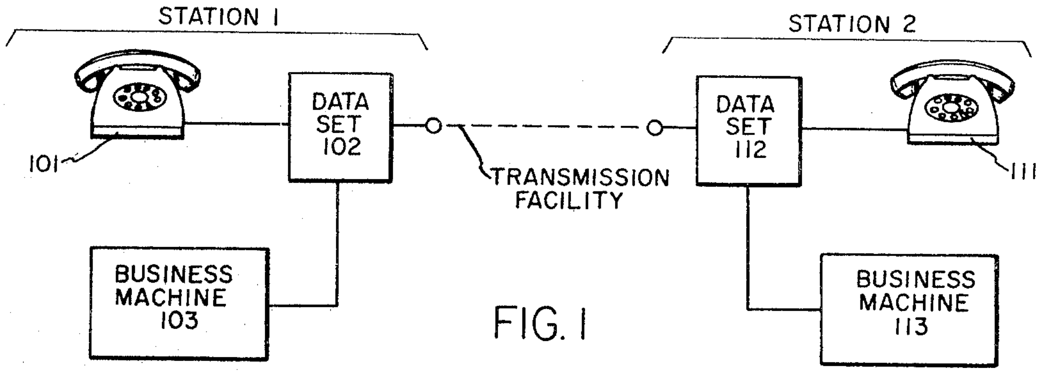
FIG. 1 is a block diagram of a voice/data network showing how an associated business machine and telephone are connected with a data set and then to a transmission facility in accordance with the present invention.

Referring first to FIG. 1 data sets according to the present invention are usually employed in the following manner. At station 1 an operator will, by means of the dial on telephone 101, establish a connection over the transmission facility to a selected station such as station 2. If station 2 is in the automatic mode an attendant will not be required to answer the call at telephone 111. The attendant at station 1 will first hear ringback tone and then automatic return of an identifying signal to indicate that station 2 has answered. After this signal is returned, the attendant will operate a data mode key associated with data set 102, to initiate the start of data transmission from business machine 103 through data set 102 and over the transmission facility to data set 112 where it will be further extended to business machine 113. If station 2 is not preset to the automatic mode an attendant will answer at telephone 111 and verbal communication may then take place with operators at either end agreeing as to the data to be transmitted under their control from either business machine 103 or business machine 113. In the non-automatic mode it may be desirable for attendants to converse before, between and after data transmissions.

Figure 6:
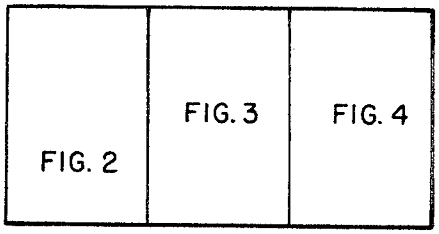
FIG. 6, located on the same sheet of drawings as FIG. 1, is a diagram showing the arrangement of FIGS. 2, 3 and 4.
Figure 2:
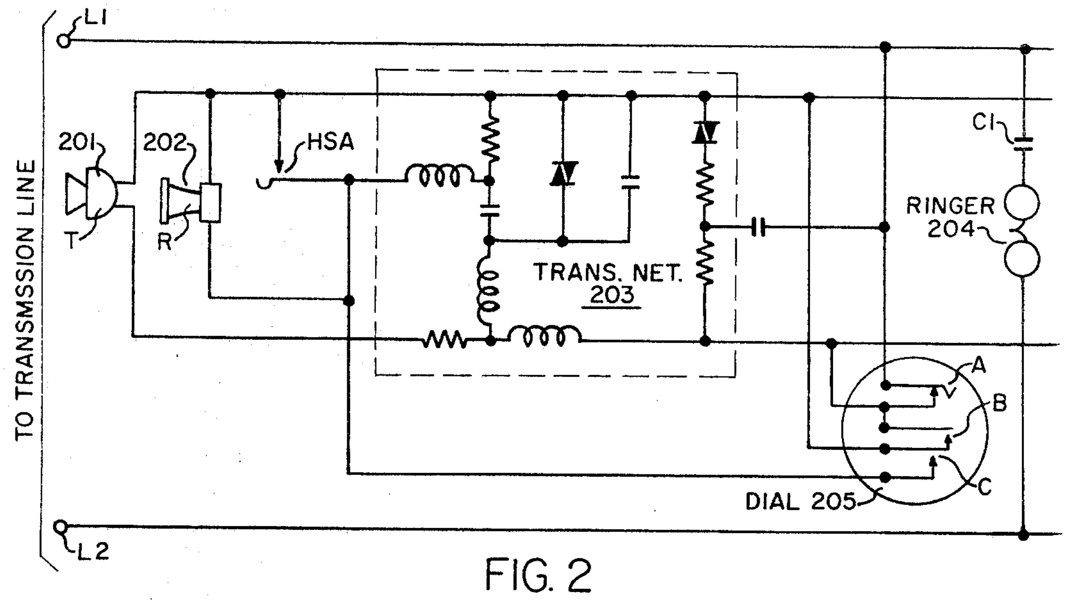
FIGS. 2, 3 and 4 comprise a diagram showing the control circuitry and associated telephone of a data set in accordance with the present invention.
Figure 3:
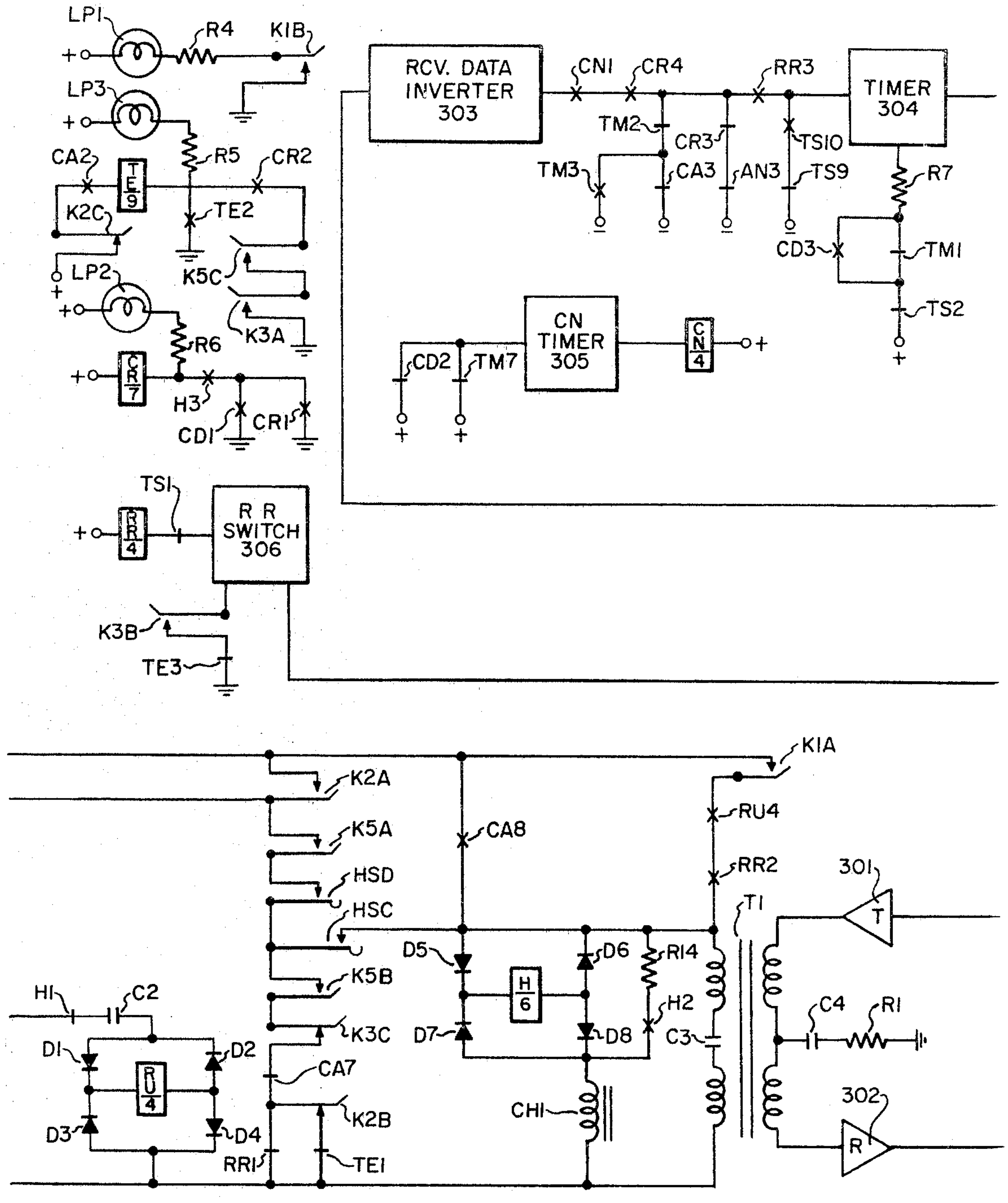
Figure 4:
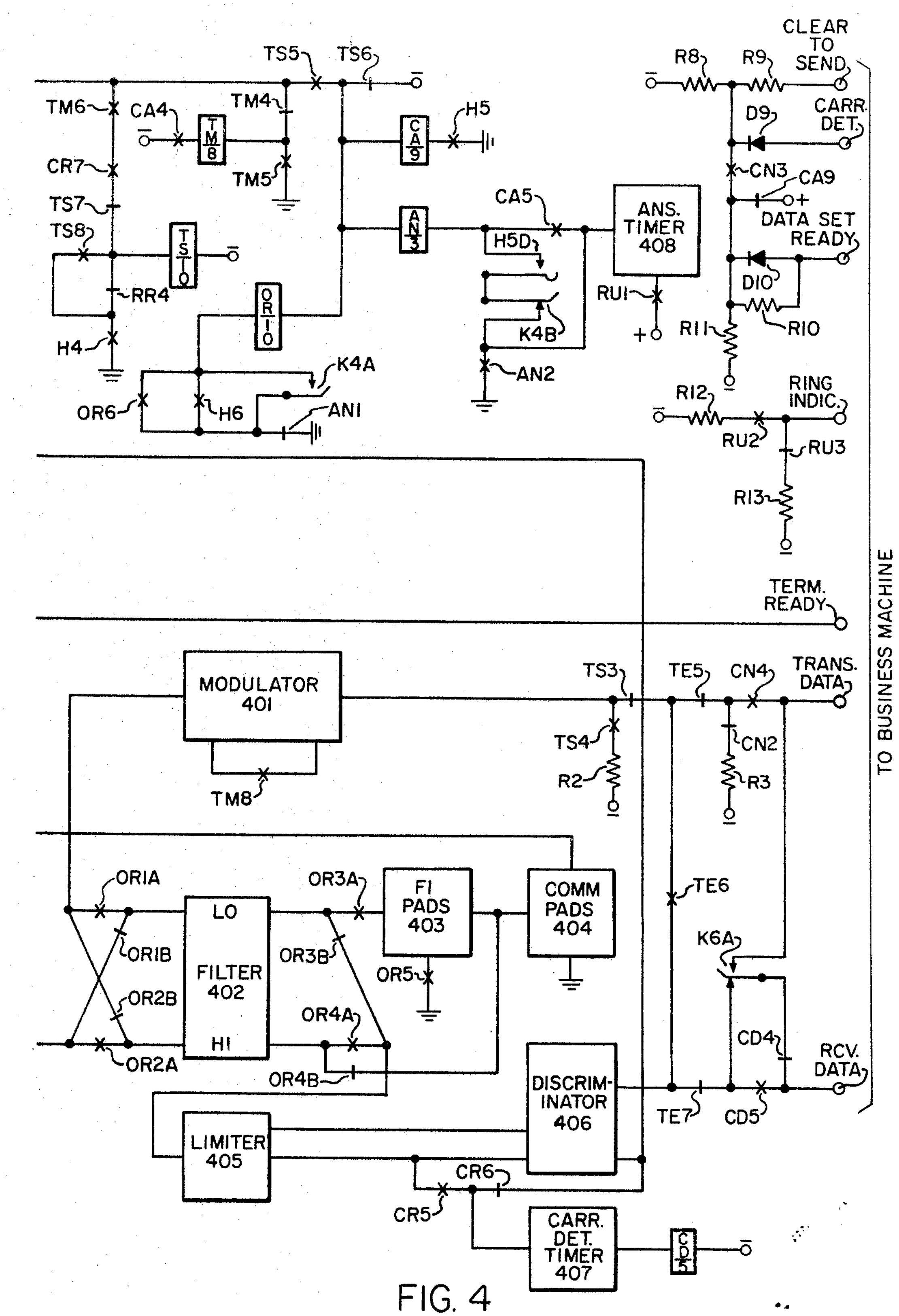

Referring now to FIGS. 2, 3 and 4, arranged as shown in FIG. 6, a better understanding of the present invention may be gained by the following detailed description of operation of data sets in accordance with the present invention.

For purposes of simplification portions of the circuitry of FIGS. 3 and 4 have been shown in block form since these circuits may assume any well known form, and their specific construction is not essential to an understanding of the present invention.

Figure 5:
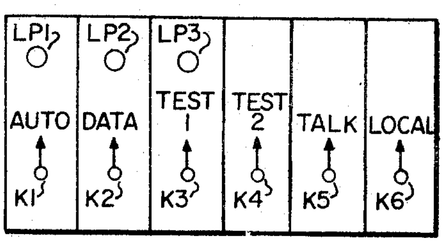
FIG. 5 is a panel layout showing an arrangement of lamps and keys for use with a data set in accordance with the present invention.

The various keys shown in detached form and alpha-numerically designated in FIGS. 3 and 4, are also shown in FIG. 5. In FIG. 5 a typical physical layout of a panel mounting the keys as well as the associated lamps is shown. In addition to the alpha-numeric indicators used in the circuit diagram of FIGS. 2, 3 and 4, the functional title of these lamps and keys also appears in FIG. 5. The operation of the preset control circuit will be described by following the procedure used to place a call between two data sets both employing the circuitry of FIGS. 2, 3 and 4 arranged for communication over a transmission facility in the manner shown in the block diagram of FIG. 1. For purposes of this description it will be assumed that the originating station is attended and that the answering station will be operated in the automatic mode.

Initially the originating station, if ready to operate, will have a signal applied at the "Terminal Ready" terminal from its associated business machine, which will cause RR switch 306 to operate and subsequently the associated RR relay. RR switch 306 is a conventional electronic switch, designed to operate the associated RR relay whenever a positive voltage greater than +3 volts exists on the "Terminal Ready" lead extending from the associated business machine. The operator will now operate the Talk Key K5 and remove from its hookswitch the handset of the telephone unit associated with the data set, permitting the hook-switch contacts HSA, HSC and HSD to operate. On hearing dial tone the attendant will dial the number of the desired station in the usual manner for establishing telephone communications, after which ring back tone will be returned if the desired station is available.

At the answering station the Auto key K1 must be previously operated, if the station is in the automatic mode. And in a manner similar to that described for the originating station, if the answering station is ready to operate, relay RR will be operated. In response to the receipt of the ringing signal the answering station relay RU will operate over a path extending from line conductor L1 through the A contacts of dial 205, break contact H1 and capacitor C2 through the diode bridge comprised of diodes D1 to D4, inclusive, and the return path over line conductor L2. Operation of the RU relay will at its associated contacts RU2 and RU3 cause the extension of a ringing indication potential to the associated business machine. Closure of contact RU4 will complete a path through previously operated Auto key K1A contacts, and the RR2 contacts associated with relay RR and complete a path from line conductor L1 to the diode bridge comprised of diodes D5, D6, D7 and D8, to relay H, with the return path to line conductor L2 being made through inductance CH1. This low impedance path across the line conductors will cause ringing to stop, and relay H to operate.

Operation of relay H will open the operate path to relay RU at break contacts H1, causing relay RU to restore and complete the operating path for relay CA at contacts H5, causing it to operate. Operation of relay CA will at its associated contacts CA5 complete an operating path between relay AN and the answer timer 408. Answer timer 408 acts as a memory device to insure that a called station will be in the answering mode if an attendant were to remove the handset and place the data set in the off-hook condition between ringing cycles. It essentially remembers that ringing has been present.

Operation of relay CA will at its associated contacts CA9 break the positive battery connection, permitting extension of a signal at the Data Set Ready terminal to the associated business machine.

The main timer 304 had a minus potential removed from its input at contact CA3, which broke with the operation of relay CA, causing it to start. The main timer 304 which may be of any conventional design, provides a delay timing interval of 1.5 seconds when associated resistor R7 is disconnected from battery, and 3.5 seconds when connected. At this time resistance R7 is in the operating circuit of timer 304 and as a result the timer will operate after 1.5 seconds causing operation of relay TM over a path through break contacts TM4 to the coil of relay TM, and then through previously operated contact CA4 to battery. Relay TM will break the operating path from the timer 304 at its associated contacts TM4, however, locking to ground at contacts TM5. At associated contacts TM8 the operating path for the oscillator included in modulator 401 will be completed, causing the transmission of a Mark signal through the high frequency portions of filter 402, through common pads 404 and through transmit amplifier 301 where it is connected to the transmission line conductors by means of hybrid transformer T1. This signal is then returned over the transmission facility to the originating data station. The modulator 401 converts the DC levels of the input data received from the business machine to the Mark and Space frequencies used to transmit the data. It typically consists of an oscillator, differential amplifier and the necessary logic circuits for shifting the oscillator frequency.

Transmit amplifier 301 matches impedances between the filter 402 and the hybrid coil T1 and also provides a fixed amount of gain for the transmitted signal. The input to the transmit amplifier 301 is from either the high or low frequency portions of filter 402 depending upon operation of relay OR. If the data set is in the "originate" mode the transmitted signal is extended to the low frequency portion to the transmit amplifier. If the data set is in the "answer" mode the transmitted signal is passed through the high frequency section.

At the originating data station, receipt of the Mark carrier from the answering station over line conductors L1 and L2, will act as a signal to the attendant to operate Data keys K2. With the previously operated Talk key K5, a short circuit exists across the H relay via hook switch contact C, key contacts K5B and K3C, break contacts CA7 and key contacts K2B and break contact TE1. Operation of the Data key removes the short circuit by opening the path at K2B permitting line current to operate relay H. The operate path for relay H is from the L1 line conductor through Data key contacts K2A, Talk key contacts K5A, hook switch contacts HSD and HSC, and the diode bridge comprising didoes D5, D6, D7 and D8; with return being through inductance CH1 to the L2 line conductor.

Operation of relay H completes an operating path for relay OR at contacts H6 to switch the high and low frequency paths through filter 402. Operation of relay H is also effective to operate relay CA by completing a path to ground at contact H5. Operation of relay CA completes a holding path for relay H at contact CA8 so as to keep the H relay operated when the Talk key and the Data key are released and when the hook switch is restored to the "on-hook" condition. The Data Set Ready signal is also extended to the business machine in the manner previously outlined, by operation of contact CA9.

When the short circuit was removed from relay H it was also removed from the primary winding of hybrid coil T1. The incoming Mark signal is now conducted through the secondary of the hybrid coil to the receive amplifier 302 through previously operated contacts on relay OR, through the high frequency section of filter 402, the limiter 405 and discriminator 406. The output signal from discriminator 406 is conducted through break contact CR6 to carrier detect timer 407. Carrier detect timer 407 times the presence of this Mark carrier signal for 150 milliseconds, and then operates the associated CD relay.

As noted signals received over the line and extended through hybrid transformer T1 are passed to the receive amplifier 302, the function of which is to match the impedance of the hybrid coil and present a low driving impedance to the following circuitry. If the data set is being operated in the "originate" mode, the received signal will be extended through the high frequency section of filter 402. However, if the data set is in the "answer" mode, received signals will be extended through the low frequency section of filter 402 to the limiter 405. The limiter circuit 405 functions to amplify and limit received signals and present a constant level signal amplitude to the discriminating 406.

The discriminator circuit 406 recovers the base band signal from the frequency modulated signal and converts it back to its original form. Of conventional design, the discriminator 406 may include a phase discriminator, low pass filter, slicer and output driver.

The carrier detect timer 407 may be of any conventional design, providing a delay of 150 milliseconds before operating the associaed CD relay. This delay prevents short noise bursts from operating the data set.

Operation of relay CD is effective at its associated contact CD1, to complete a path from ground through the previously operated contact H3, to relay CR and to the Data lamp LP2, causing both relay CR and lamp LP2 to be operated. Relay CR will then hold itself operated through its associated CR1 contact.

The initial return of a Mark signal from the answering station to the originating station, with its receipt at the originating station, followed by return of a Mark signal from the originating station to the answering station acts as an indication to each station that they are prepared to transmit and/or receive data. This identifying signal exchange is referred to as "hand shaking" and constitutes the conditioning procedure required before the exchange of data.

Operation of lamp LP2, the Data lamp, indicates to the attendant that both the originating and answering stations are in the data mode, with the "hand shaking" or signal exchange process being complete, and indicating the existence of a valid data link.

At contacts CR5 and CR6 the input to the carrier detect timer 407 is transferred from the discriminator 406 to the limiter 405 enabling the carrier detect timer 407 to monitor the presence of carrier rather than just the Mark signal. Operation of the CR relay is also effective at contact CR3 to remove potential from the input to timer 304, to start timing. At this time relays TS and TM are not operated; thus, resistance R7 is included in the timer circuit 304, causing it to time for an interval of 1.5 seconds, at the end of which relay TM operates.

At the originating station operation of relay TM at associated contact TM8 actuates the oscillator contained within modulator 401 so that a Mark signal is transmitted to the line over a path through operated contacts OR1A, the low frequency portion of filter 408, F1 pads 403, common pads 404, the transmit amplifier 301, hybrid transformer T1 and line conductors L1 and L2 to the transmission facility. Operation of relay TM at its associated contacts TM7 removes battery from the CN timer 305, causing it to time for a period of 250 milliseconds. CN timer 305, which likewise may be of any conventional design, is used to provide the necessary delay before informing the associated business machine that it may transmit data. This delay of 250 milliseconds is used to insure that the distant station has received carrier and is in the mode necessary to receive data. After this interval relay CN operates, causing the extension at contact CN3 of a positive potential on the Clear To Send lead and the Carrier Detect lead, both extending to the associated business machine. At contact CN4 the Transmit Data lead from the associated business machine is connected to the modulator 401 and at contacts CN1 the output of the receive data inverter 303 is connected to timer 304.

The received data inverter 303 is driven by the output of discriminator 406 and provides inversion of the data signal as well as current amplification. Timer 304 is now conditioned to monitor the data received for the presence of a long Space disconnect signal. While the CN timer 304 at the originating station is timing for its 250 millisecond period the answering station is receiving Mark carrier. This signal is detected in the same manner as Mark carrier was detected at the originating station. The carrier detect timer 407 at the answering station cause operation of associated relay CD after a period of 150 milliseconds and subsequently operation of relay CR.

In a manner similar to that previously outlined for the originating station the CN timer 305 at the answering station will be actuated to time for an interval of 250 milliseconds and the Data lamp LP2 will operate. After completion of the 250 millisecond interval associated relay CN will operate. Operation of relay CN connects timer 304 to the receive data inverter 303 resetting the timer before the timer can complete the 3.5 second time out interval. If Mark carrier is not received within 3.5 seconds from the time the answering station sent out Mark carrier, the answering station will drop the connection.

Operation of relay CN also causes extension of the appropriate signals over the Clear To Send and the Carrier Detect leads extending to the business machine associated with the answering station, as well as completing a circuit from the associated business machine to the modulator 401 at the answering station in the manner previously described. The data message may now be transmitted between originating and answering stations.

If carrier is lost for more than 150 milliseconds during the data message portion of the call, carrier detect timer 407 would cause relay CD to restore. At associated contacts CD2 battery would be placed on the input of CN timer 305 causing it to reset and drop relay CN. Operation of relay CN will at associated contact CN4 open the Transmit Data lead between the associated business machine and the modulator. At contact CN2 battery will be extended to the input of the modulator causing it to remain in the Mark state. Likewise the Clear to Send and Carrier Detect leads extending to the associated business machine will switch to the Mark state. Restoration of relay CN will at contact CN1 remove the received data inverter 303 output from timer 304 causing it to start timing. Timer 304 after a 3.5 second delay will extend ground to relay TS causing it to operate. Operation of relay TS will at associated contacts TS6 break the holding path from battery for relay CA causing it to restore. Restoration of relay CA will at associated contacts CA8 break the holding path for relay H from line conductor L1.

Restoration of relay H will effectively remove the holding bridge at contacts H2 across the line conductors L1 and L2, causing the data set to disconnect from the transmission line. Restoration of relay H will also restore the circuit path to relay RU at contact H1, cause relay CR to restore by restoration of contact H3, break the holding path for relay TS at contact H4, break the holding path for relay CA at contact H5 and open the initial operating path for relay OR at contact H6. With the restoration of contacts H3 the data lamp LP2 will extinguish acting as a visual indication that the data link has been broken.

Assume now that carrier has not been lost and that the required data has been transmitted. If the originating station wishes to terminate the call it is necessary for him to apply an "off" signal on the Terminal Ready lead extending to RR switch 306. This signal would be effective to deenergize switch 306 and cause restoration of relay RR4. Operation of relay RR will at associated contacts RR3 disconnect the output of inverter 303 from the timer 304 causing it to operate after a 3.5 second delay to operate TS. The ensuing chain of operations causing relay CA and H to restore and to disconnect the data set are the same as outlined above in connection with the automatic disconnect, achieved as the result of loss of carrier.

As outlined above, operation of relay TS applies a positive voltage to the input of modulator 401 causing it to transmit a long Space signal. At the answering station this Space signal is received and detected and extended from the receive data inverter 303 to the main timer 304. This timer starts timing whenever its input goes to the space state. During transmission of data the Space signal is never present for more than 1.2 seconds therefore the timer is always reset before it can operate. However during the disconnect sequence a Space signal is received for more than 1.5 seconds and timer 304 will operate after 3.5 seconds extending ground to relay TS causing it to operate, locking to its own hold path at contacts TS8. Contacts TS3 will then disconnect the Transmit Data lead from the modulator 401 at the answering station and connect potential through contacts TS4 to the input of the modulator.

The timer 304 will also be reset by the operation of the make-break combination comprised of contacts TS10 and TS9. In this combination TS10 operates slightly before TS9 completing the path to battery for resetting the timer. At contacts TS6 relay CA is made to restore and as a result relay H also restores causing disconnection of the answering data set in the manner previously outlined. The data set is now in its idle condition and is ready to receive another call. All relays will now be in the non-operated position and all interface leads are in the "off" or "hold" state. The only difference between disconnect at the answering and originating stations, deals with the disconnect of the AN relay at the answering station and the OR relay at the originating station.

While the present invention has been described with reference to a preferred embodiment, it is not intended to limit the scope of the invention to this particular application inasmuch as it is obvious that the data indicating means, for example, might well be employed in other forms of data transmission systems and still fall within the true spirit and scope of the invention.

What is claimed is:

1. For use in a communications system including a communication channel to which are connected a plurality of data subsets, an improved subset operable in a voice mode to transmit and receive voice signals and operable in a data mode to transmit and receive data signals, and adapted for connection to said communication channel, said improved subset including: data mode indicating means; data signal detecting means including circuit connections to said indicating means and connectable to said communication channel; data mode selection means including circuit connections to said indicating means and to said communication channel, operated to select said data mode, to condition said indicating means and connect said communication channel to said detecting means; said detecting means operated in response to receipt of a data signal transmitted from one of said other subsets over said communication channel to operate said conditioned indicating means.

2. A subset as claimed in claim 1 wherein said data mode indicating means comprise: a visual indicator connected to said data mode selection means and to said data signal detection means, conditioned in response to operation of said selection means, and operated after conditioning in response to operation of said detecting means; and a relay connected to said visual indicating means, said selection means and said detecting means, operated in response to said selection means and to said detecting means to maintain said visual indicating means operated after termination of said data signal.

3. A subset as claimed in claim 1 wherein said data signal detecting means comprise: a signal detector connected to said communication channel in response to operation of said selection means, and operated in response to receipt of a data signal transmitted over said communication channel from one of said other subsets; and a relay connected to said detector and to said indicating means operated in response to operation of said detecting means to operate said conditioned indicating means.

4. A subset as claimed in claim 1 wherein said data mode selection means comprise: a relay including circuit connection to said data mode indicating means, operable to condition said indicating means; and a key connected to said relay and to said communication channel, manually operated to select said data mode of operation, to operate said relay and to connect said communication channel to said data signal detecting means.

References Cited

UNITED STATES PATENTS

| | | | |
|---|---|---|---|
| 3,288,932 | 11/1966 | Cleary et al. | |
| 3,307,156 | 2/1967 | Durr | 340—172.5 |
| 3,320,368 | 5/1967 | Applebaum. | |
| 3,413,423 | 11/1968 | Stevko. | |

KATHLEEN H. CLAFFY, Primary Examiner

R. P. MYERS, Assistant Examiner

U.S. Cl. X.R.

179—2